UNITED STATES PATENT OFFICE.

JOSEPH HURSH AND ABRAHAM HURSH, OF PHILADELPHIA, PENNSYLVANIA.

IMPROVED FERTILIZER.

Specification forming part of Letters Patent No. 55,871, dated June 26, 1866.

*To all whom it may concern:*

Be it known that we, JOSEPH HURSH and ABRAHAM HURSH, of the city and county of Philadelphia, and State of Pennsylvania, have invented a new and Improved Fertilizer; and we do hereby declare that the following is a full, clear, and exact description of the same.

The nature of our invention consists in the application of ocher to soils to improve their yielding capacity.

In order to obtain the material at a cheap rate, so as to bring it within the means of all farmers, and others who wish to use it, we obtain it from its natural deposits in low localities, as along the banks of rivers and in hollows, where it is not wanted for the purpose of agriculture.

We separate the ocher from the sand in any convenient manner, freeing it altogether of other matters, or retaining with it such as may have fertilizing properties, at pleasure. We apply it to soils in any of the usual modes for applying other fertilizers. Although ocher is valuable for the purpose in its raw state, we find that burning it improves its quality in a remarkable degree. It may be used mixed with other fertilizers in various proportions, or separate, to suit the views of those who adopt the use of it.

For some purposes it may be found advantageous to apply the ocher in a mixed state for other reasons than merely for economy; but as to this experience will be the best test.

What we claim as new, and desire to secure by Letters Patent, is—

The application of ocher as a fertilizer in either a raw or burnt state, substantially as described.

In testimony that the above is our invention we have hereunto set our hands and affixed our seals this 21st day of August, 1865.

JOSEPH HURSH. [L. S.]
ABRAHAM HURSH. [L. S.]

Witnesses:
STEPHEN USTICK,
W. W. DOUGHERTY.